United States Patent
Busuioc

(10) Patent No.: US 6,377,672 B1
(45) Date of Patent: Apr. 23, 2002

(54) FRAUD MONITORING IN A TELECOMMUNICATIONS NETWORK

(75) Inventor: Nicolae M. Busuioc, Suffolk (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/029,846

(22) PCT Filed: Mar. 25, 1997

(86) PCT No.: PCT/GB97/00836

§ 371 Date: Mar. 10, 1998

§ 102(e) Date: Mar. 10, 1998

(87) PCT Pub. No.: WO97/37486

PCT Pub. Date: Oct. 9, 1997

(30) Foreign Application Priority Data

Mar. 29, 1996 (EP) .............................. 96302240

(51) Int. Cl.[7] .......................... H04M 3/00; H04M 15/00
(52) U.S. Cl. .................................. 379/189; 379/114.4
(58) Field of Search .................... 379/189, 196

(56) References Cited

U.S. PATENT DOCUMENTS

| | | |
|---|---|---|
| 4,182,934 A | 1/1980 | Keys et al. |
| 5,420,910 A | 5/1995 | Rudokas et al. |
| 5,602,906 A | 2/1997 | Phelps |

FOREIGN PATENT DOCUMENTS

| | | | |
|---|---|---|---|
| EP | 0583135 A2 | | 2/1994 |
| EP | 0618713 A2 | | 10/1994 |
| EP | 0653868 A2 | * | 5/1995 |
| EP | 0661863 A2 | | 7/1995 |
| WO | WO 94/11959 | | 5/1994 |

* cited by examiner

*Primary Examiner*—Ahmad F. Matar
*Assistant Examiner*—Hector Agdeppa
(74) *Attorney, Agent, or Firm*—Nixon & Vanderhye P.C.

(57) ABSTRACT

A method of and system for detecting the possible fraudulent use of a telecommunications network involves applying rule-based criteria to generate a plurality of fraud alarms, each corresponding to an individual rule. Each alarm is associated with a particular customer, and for each individual customer a note is made of the total alarms generated by that customer and the grouping of individual alarm types generated. The customer's call is then determined to be fraudulent or otherwise based upon prior experience of past customers who have generated that particular profile of alarm grouping and total number of alarms. The system automatically outputs a list of potentially fraudulent customers, the accounts of which may either be further investigated or may automatically be inhibited.

15 Claims, 2 Drawing Sheets

FRAUD MONITORING IN A TELECOMMUNICATIONS NETWORK

BACKGROUND OF THE INVENTION

1. Field of the Invention

Figure 1:
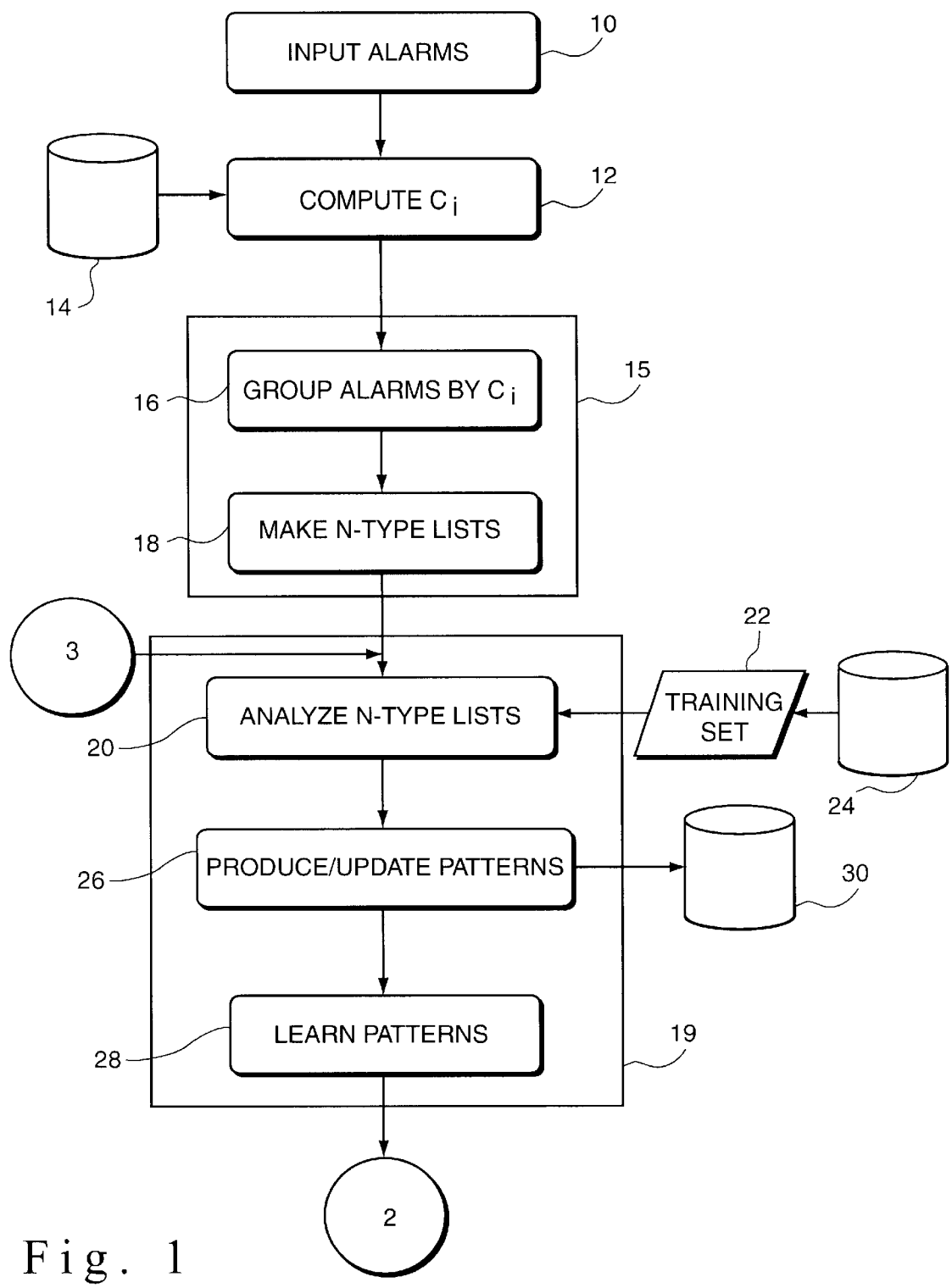

The present invention relates a telecommunications network and more particularly to a method of, and a system for, detecting the possible fraudulent use of a telecommunications network.

2. Background of Related Art

Rule-based fraud detection systems attempt to detect fraudulent usage by comparing details of individual calls over the telecommunications network with a series of one or more predefined rules. If a particular usage of the network (to be referred to throughout this specification as a "call record") triggers one or more of the predefined rules, an alarm is generated, enabling human operators to take the necessary action. While such systems have had some success in combating fraud, difficulties tend to arise due to the sheer number of alarms that wan be generated within a short time. Typically, fraud detection operators may have tens of thousands of live alarms to deal with during a day, and it is therefore generally impractical to deal with each individual alarm as it arises. Methods have been developed for consolidating or grouping the fraud alarms based on their priority, but the workload for the fraud operators still remains substantial.

Work has been done to provide correlated fault alarms for identifying possible faulty network devices and/or failure of communication links in telecommunication networks. However, the correlation process here relies very much upon the fact that the network topology is well known, with the alarms and the alarms correlations being calculated on that basis.

BRIEF SUMMARY OF THE INVENTION

It is an object of the present invention at least to alleviate these problems. It is a further object to provide a method of, and a system for, detecting the possible fraudulent use of a telecommunications network which can be used across a range of products and services.

According to a first aspect of the present invention there is provided a method of detecting the possible fraudulent use of a telecommunications network, the method comprising:

(a) receiving alarms indicative of potentially fraudulent calls on the network, the alarms being divided into a plurality of alarm types;

(b) associating a unique customer identifier with each alarm;

(c) selecting a test class of customer identifiers such that each customer identifier in the test class is associated with a given grouping of alarm types;

(d) identifying those customer identifiers within the test class that are associated with known fraudulent calls and deriving a measure therefrom indicative of fraud within the test class; and (e) determining that any customer identifier associated with further alarms is connected with fraudulent use of the network if it falls within the test class and if the measure for that class exceeds a given level.

According to a second aspect of the invention there is provided a system for detecting the possible fraudulent use of a telecommunications network, the system comprising:

(a) means for receiving alarms indicative of potentially fraudulent calls on the network, the alarms being divided into a plurality of alarm types;

(b) means for associating a unique customer identifier with each alarm;

(c) means for selecting a test class of customer identifiers such that each customer identifier in the test class is associated with a given grouping of alarm types;

(d) means for identifying those customer identifiers within the test class that are associated with known fraudulent calls and deriving a measure therefrom indicative of fraud within the test class; and (e) means for determining that any customer identifier associated with further alarms is connected with fraudulent use of the network if it falls within the test class and if the measure for that class exceeds a given level.

By iterating the method, the system gradually learns and becomes more effective at identifying fraud.

The present invention discovers patterns in the alarm data, and operates on those, rather than operating on the rules that generate the alarms themselves. Preferably, the system attempts to detect fraudulent usage by measuring and comparing the parameters values of individual calls, over the telecommunications network, against pre-set thresholds within the detection rules. This allows for a reduced number of derived alarms to be created, thereby easing the task of the fraud operators. In contrast with known network fault alarm correlations, the invention is not limited to use on any specific network or on any specific model. Instead, it identifies fraud trends by identifying patterns in particular groupings of raw alarms. The solution is applicable across all products and services.

In one form, the invention may provide the fraud operators with a display identifying, in order, those groups of alarms which are most indicative of the presence of fraud and, against each group, a list of (normalized) customer identifiers whose calls have triggered alarms in that particular group. A numerical measure may be associated with each grouping, providing the fraud operators with a quantitative estimate of the probability that a particular customer identifier is associated with fraudulent calls.

The system may automatically determine that certain alarm groupings are associated with fraud (for example if the measure exceeds a predefined value), and may automatically inhibit the user accounts corresponding to the user identifiers which fall within those groupings. Alternatively, the information may be provided to human operators, who may reserve to themselves the final decisions.

It is not essential, of course, that the measure takes the form of a single numerical value. It could, instead, consist of several numerical or non-numerical indicators that may be tested against a predefined level. Again, the given level in that case need not itself be a single numerical value. It will be understood, of course, that if the measure increases with fraud, then it will exceed the given level in the upward-going direction when the measure is larger than the level. On the other hand, if the measure is designed to fall with increasing fraud, then it will exceed the given level in the downward-going direction when it falls to a value below that of the given level.

In its various forms, the invention, or preferred aspects of it, may provide a very concise easily-understood presentation of alarm information to the fraud operator. It provides improved use of alarm data, along with the flexibility to add new alarm types and continuously to detect and learn new alarm types. It allows easier detection of fraud by the human operator, or alternatively may be arranged to detect fraud automatically. This may provide substantial revenue savings from the increased ability of the fraud detection systems, as a whole, to detect fraud at an early stage and to apply preventative measures.

BRIEF DESCRIPTION DRAWINGS

Figure 2:
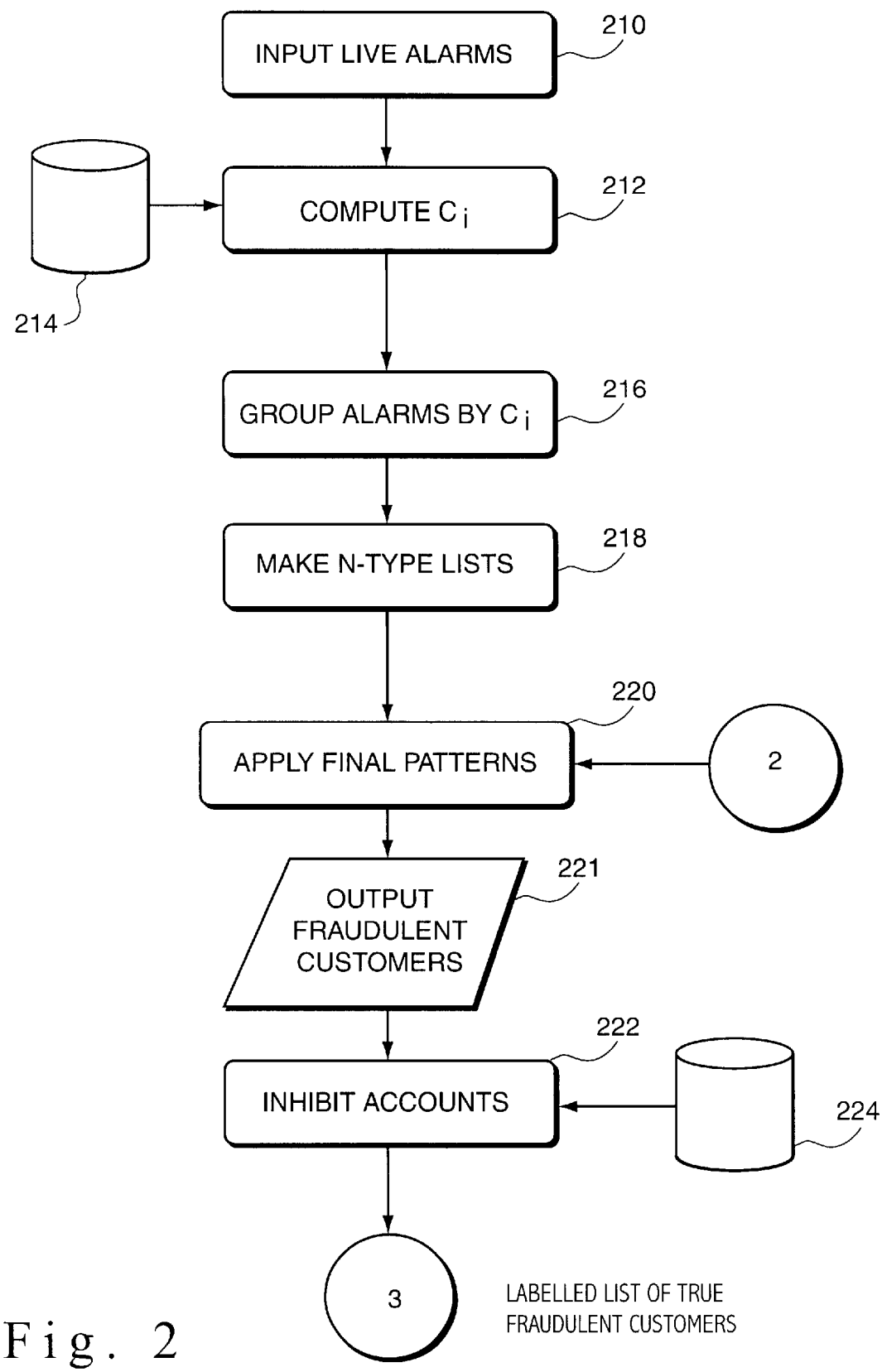

The invention may be carried into practice in a number of ways and one specific embodiment will now be described, by way of example, with reference to the accompanying figures, in which:

FIG. 1 shows how the system is trained and the alarms patterns are refined over time; and FIG. 2 shows how the system is used on real data but continues to learn new patterns through performance evaluation.

DESCRIPTION OF EXEMPLARY EMBODIMENTS

The fraud detection method and system shown in FIGS. 1 and 2 may typically be embodied in a computer program running on a dedicated server which is attached to the telecommunications network to be monitored. Depending on the size of the network, there may be a single server, or the system may be duplicated on several servers, spaced across the network. All or parts (modules) of the system could alternatively be hard-coded rather than being embodied by way of a computer program, especially the modules engaged in pure computation. The system is designed to receive information from external sources across the network, in the form of a plurality of fraud alarms $A_i$. These alarms are generated by testing each call that is made on the telecommunications network against a corresponding rule set, with the alarm being automatically activated if the call matches the requirements of the rule. The rules are preferably independent, or at least partially so, so that if for example a single call activates alarms $A_1$ and $A_2$, the existence of both alarms provides some additional evidence by way of cross-check that the call is indeed fraudulent, over and above the information that would be provided by one of the alarms alone. One rule might state, for example, that fraud is a possibility if the call is an international call being made from a public call box to a country known to be a supplier of illegal drugs. Another rule might suggest fraud if the call has been paid for by charge-card, and the call does not fit the call history on that particular account. A further rule might suggest that fraud is taking place if a low-usage charge-card customer suddenly starts making a long series of international telephone calls to different countries from a public phone box.

Each alarm $A_i$ may be associated with a particular customer $C_i$ who is paying the bill for the call that generated that alarm.

For ease of description the preferred embodiment will be described with reference to FIGS. 1 and 2, and concurrently in association wish a hypothetical worked example. The example will assume that alarms are generated by four different rules, giving rise to four separate alarm types $A_1$, $A_2$, $A_3$ and $A_4$. It will also be assumed that the network has nine customers, identified respectively as $C_1$ to $C_9$.

Before the system may be operated on live data, it first has to be trained through various training cycles using a set of preexisting alarm data. This is data that has been already analyzed by the fraud operators who have labelled each alarm accordingly as indicative of real fraud or not fraud. Turning first to FIG. 1, the test alarms are received by the system at 10, and the corresponding $C_i$ for each alarm $A_i$ is then determined at 12. To assist in this determination, information from an external or internal database 14 may be used. If the customer is a direct customer of the telecommunications network owner, customer details may be looked up directly in the corresponding customer database. On the other hand, the customer may have connected into the network being monitored via another network (perhaps abroad) and the fraud operators may accordingly have no direct access to customer and billing details for that particular customer. In such a case, the customer is merely identified for the purposes of the system by a unique reference number; this could come from information provided by the owner of the foreign network or, in the absence of that, from a combination of the calling number and the called number.

Once each alarm $A_i$ has been associated with a particular customer $C_i$, the information is passed on to a statistical analyzer module 15 which first groups the alarms by $C_i$ as indicated at 16. A typical grouping for the example being considered might be as follows: Training Set:

| $C_i$ | $A_1$ | $A_2$ | $A_3$ | $A_4$ | $X_i$ |
|---|---|---|---|---|---|
| $C_1$ | 1 | 1 | 1 | 2 | 5 |
| $C_2$ | 0 | 0 | 3 | 2 | 5 |
| $C_3$ | 1 | 1 | 1 | 1 | 4 |
| $C_4$ | 1 | 1 | 1 | 1 | 4 |
| $C_5$ | 2 | 1 | 1 | 1 | 5 |
| $C_6$ | 1 | 2 | 0 | 0 | 3 |
| $C_7$ | 0 | 0 | 3 | 2 | 5 |
| $C_8$ | 1 | 2 | 1 | 1 | 5 |
| $C_9$ | 0 | 0 | 2 | 3 | 5 |

Each cell in the table represents the number of times a particular alarm has been triggered for that particular customer. For example, customer $C_1$ has triggered alarms $A_1$, $A_2$ and $A_3$ once each, and has triggered alarm $A_4$ twice. The last column in the table, labelled $X_i$, simply represents the total number of alarms of all types for customer $C_i$.

The alarms in the training set are now re-grouped into the "N-type list" shown below. This is a table in which each row represents one of the possible groupings G of the alarms $A_i$, as determined from the training set. Each column of the table represents the total number of alarms of all types, $X_i$. Each customer $C_i$ appears exactly once in the table. N-type List:

| G | 5 | 4 | 3 |
|---|---|---|---|
| $A_1\ A_2\ A_3\ A_4$ | $C_1\ C_5\ C_8$ | $C_3\ C_4$ | |
| $A_1\ A_2$ | | | $C_6$ |
| $A_3\ A_4$ | $C_2\ C_7\ C_9$ | | |

It can be seen from the table that there are three customers who actuated a total of five alarms in all four alarm types, namely $C_1$, $C_5$ and $C_8$.

The information from the N-type list is passed to a pattern extractor module 19, which first analyzes it, at 20. Input is provided from the training set 22 and from an external database 24 which might include, for example, details of the billing and/or call histories of the customers being investigated. The analysis is carried out by asking skilled operators to check the training set, and to determine for each of the customers $C_i$ whether that customer is in fact fraudulent or not. From the information in the external database, the fraud operators may be able to say with some certainty that particular customers are indeed acting fraudulently. For this particular example it will be assumed that customers $C_1$, $C_3$, $C_5$ and $C_9$ are fraudulent; these are shown in bold type in the N-type list above.

At step 26, alarm patterns are produced by considering individually each populated cell within the table. Taking first the top left cell, it will be apparent that two of the three customers in that cell are considered fraudulent, so it can be said that the chance of a customer falling into that cell being fraudulent is about 67%. In the adjacent cell, containing $C_3$ and $C_4$, only one of the two customers has been flagged as fraudulent, so the ratio for that cell is 50%. Continuing with the other cells, one can produce an alarm pattern table as follows:

| $F_i$ | $X_i$ | G | $C_i$ |
|---|---|---|---|
| 67% | 5 | $A_1 A_2 A_3 A_4$ | $C_1 C_5 C_8$ |
| 50% | 4 | $A_1 A_2 A_3 A_4$ | $C_3 C_4$ |
| 33% | 5 | $A_3 A_4$ | $C_2 C_7 C_9$ |
| 0% | 3 | $A_1 A_2$ | $C_6$ |

In the alarm pattern table, each populated cell in the N-type list has its own row, the rows being ordered by the value of F, the likelihood of a customer who appears in that row being fraudulent.

In the above table, the group $A_1 A_2 A_3 A_4$ appears twice, and the table is now refined so that each alarm group is represented by a single row. The combined likelihood for the first two rows can be computed using the formula:

$$F = \Sigma_j (X_{ij} F_{ij}) / \Sigma_j X_{ij}$$

where $j$=number of distinct $X_i$ for this alarm group (here $j$=2, since $X_i$=4 and 5)

$F_{ij}$=the partial likelihoods of each row (here 67% and 50%).

This gives a combined likelihood for the first two rows of $$F = (5 \times 0.67 + 4 \times 0.50)/(5+4) = 59.4\%.$$

This, then, is the overall likelihood of fraud within the group $A_1 A_2 A_3 A_4$.

Each combined or individual likelihood $F_i$ may have associated with it a confidence value $K_i$ (not shown in the table above). This may be computed as the ratio of fraudulent customers in this group to the number of fraudulent customers in all groups detected in the current training set.

After rebuilding the table and ordering by combined likelihood values, one may see from the $C_i$ column that customers $C_1$, $C_5$ and $C_3$ are fraudulent, and that $C_4$ and $C_8$ are suspicious. The system may automatically keep track of the fraudulent and suspicious customers by storing them in appropriate databases, including a suspicious customer database 30 (FIG. 1).

The current table now reads as follows:

| $F_i$ | $K_i$ | $X_i$ | G | $C_i$ |
|---|---|---|---|---|
| 59.4% | 75% | 5,4 | $A_1 A_2 A_3 A_4$ | $C_1 C_5 C_8 C_3 C_4$ |
| 33% | 25% | 5 | $A_3 A_4$ | $C_2 C_7 C_9$ |
| 0% |  | 3 | $A_1 A_2$ | $C_6$ |

Where the values $K_i$ are here assumed to have been calculated as shown based upon the rest of the data set.

It will be noted that customers $C_8$ and $C_4$ appear in the top row, along with $C_1$ and $C_5$, indicating that they may be fraudulent as well. Customer $C_9$, on the other hand, appears in the second row with $C_2$ and $C_7$; so $C_2$ and $C_7$ have to be treated as suspicious.

The system now learns the patterns set out in the alarm pattern table, at step 28 of FIG. 1. The learned patterns include a cut-off point above which all customers are to be deemed potentially fraudulent; here, the cut-off point may be for example 30%, so that groups $A_1 A_2 A_3 A_4$ and $A_3 A_4$ may be considered as indicative of at least potential fraud.

In an alternative embodiment, the value of F may be calculated in some more sophisticated way simply than taking the number of known fraudulent customers in a particular cell, and dividing by the total number of customers in that cell. The figures might be weighted, for example, in dependence upon the cost of the potential fraud. This could be derived from the cost of all of the individual calls made by the customer which have produced alarms, or all of such calls that have taken place over a defined period such as the last seven days. Other criteria may no doubt occur to the one of ordinary skill in the art.

The next stage in the procedure is to refine and update the learned patterns through a new training cycle. A new training data set is provided at the input module 10 and after the same computations as previously described, new alarm types are produced and the old ones are updated, as described below, at 26.

Let us assume now that during the second training cycle the group $A_1 A_2 A_3 A_4$ consists of only one fraudulent customer, and that $X_i$ for that customer equals 3. Accordingly, using the same analysis as before, the value of $F_i$ for that group will be 100%. Let us assume, further, that the corresponding confidence $K_i$ equals 10%.

The likelihood of fraud for this new alarm group is now updated at 26 using the equation:

$$F_{update} = K_{old} F_{old} + K_{new} F_{new}$$

For the present example, this gives:

$$F_{update} = 59.4 \times 0.75 + 0.1 \times 100 = 54.5\%.$$

Once the patterns have been updated at 26, they are then learned at 28. Once the underlying patterns have been revised as necessary to provide optimal performance, the final alarm pattern is output and/or stored for use on live data.

Turning now to FIG. 2, we will describe how the system is run on real alarm data That is live, unlabeled alarms). The live data to be monitored arrives by way of the live alarms 210, against which are computed the corresponding customers $C_i$ at step 212. As before, an external database 214 may be used as necessary. The alarms are grouped by $C_i$ at 216, and N-type lists constructed at 218.

The final alarm pattern table is applied against the N-type list at 220, and any customer who appears in the top row of that list (or more generally, who appears in any of the uppermost rows in which the value F is greater than a defined threshold value) is output at 221 as a fraudulent customer.

The fraudulent customers list 221 is considered by the fraud operators at 222, and those customers who are considered to be truly fraudulent have their accounts inhibited at that stage. In deciding which customers are truly fraudulent, the fraud operators may have access to additional database information, as indicated at 224.

The labelled list of true fraudulent customers is then sent back, as indicated in FIGS. 1 and 2, to the pattern extractor nodule 19 where the pattern likelihoods are adjusted accordingly, and new alarm groups are added as necessary.

Then the whole process restarted on receipt of a new group of real alarm data at 210 for processing. The process shown in FIG. 2 is continually reiterated, with the result that the grouped alarms, the N-type list and the alarm pattern table continually changes according to the customers currently involved and the particular alarms and alarm groups they have generated. The alarm pattern table may be shown on the fraud operator's screen, and will constantly be updated as the groupings and the customers change. As customer accounts are inhibited, customers in the uppermost rows which are now defined as fraudulent continually disappear, with others coming in all the time.

The fraud operators are provided with a readily-comprehensible list of potentially fraudulent customers, (from the suspicious customers database 30), ordered according to the likelihood of fraud. It is therefore relatively easy for the operators to inhibit accounts as necessary, either manually or automatically. A combination of both may be used, for example all customers having a value of F greater than 95% may automatically have their accounts inhibited, and all customers having a value F between 85% and 95% may be considered for further manual investigation.

Some customers may of course not be customers of the telecommunications network which is being monitored, in which case it may not be possible to inhibit their accounts. However, since each customer has a unique reference identifier $C_i$, the necessary information can be passed to the owners of the external network from which the call is emanating, suggesting that they might investigate this particular customer account.

Manual or automatic investigations may also be made as to the connections between the fraudulent customers, to check for evidence of organized crime.

The threshold in F for determining whether a customer is fraudulent may be varied either manually or automatically as desired. Continually varying the cut-off points avoids the problem of fraudsters getting to know what the cut-off points are, and altering their behavior accordingly.

It will be understood of course that in a practical system there may be an extremely large number of alarm categories $A_i$, and a consequently large number of category groups G in the N-type list. There will also be a large number of customers, with the result that the statistical analysis involved in creating the alarm pattern table will be substantially more reliable than may have appeared from the simplistic example that has been used for the purposes of discussion.

In one preferred embodiment, the system may keep a running total over time of the percentage of customers falling into each cell of the N-type list who either automatically or manually. have their accounts inhibited as being used fraudulently. This information may be used to provide constantly updated values of F for each cell or alarm grouping, thereby allowing the order of entries in the alarm pattern table to change over time as the fraudster's behavior varies.

We claim:

1. A method of detecting possible fraudulent use of a telecommunications network, the method comprising:
   (a) receiving alarms indicative of potentially fraudulent calls on the network, the alarms being divided into a plurality of alarm types;
   (b) associating a unique customer identifier with each alarm;
   (c) selecting a training set of customer identifiers such that each customer identifier in the training set is associated with a given grouping of alarm types;
   (d) identifying those customer identifiers within the training set that are associated with known fraudulent calls and deriving a measure therefrom indicative of fraud within each said given grouping within the training set;
   (e) determining that any customer identifier associated with a grouping of further alarms is connected with fraudulent use of the network if the grouping of the further alarms corresponds to one of the given grouping of alarms within said training set and if said respective measure of alarms for that grouping exceeds a given level, the measure being a function of:
      (A) the number of customer identifiers within the given grouping that are associated with the known fraudulent calls;
      (B) the total number of customer identifiers in the given grouping; in which the function is the ratio (A)/(B);
   (f) determining a confidence factor for each said given grouping, said factor being a function of:
      (A) the number of customer identifiers within the given grouping that are associated with known fraudulent calls:
      (C) the total number of customer identifiers within the training set that are associated with the known fraudulent calls:
   in which the function determining the confidence factor is a ratio (A)/(C); and
   using said confidence factor in subsequent updating of the respective measures for each of said given groupings.

2. A method as claimed in claim 1 including a further or alternative measure which is a function of the potential costs of the known fraudulent calls related to customer identifiers falling into the training set.

3. A method as claimed in claim 1 in which the said given level is user-defined.

4. A method as claimed in claim 1 in which said given grouping of alarm types is at least partly defined by a unique combination of available alarm types or of any subset thereof.

5. A method as claimed in claim 1 in which said given grouping of alarm types is at least partly defined by:
   (a) a unique combinations of available alarm types or of any subset theory; and
   (b) the total number of alarms of all types for the combination.

6. A method as claimed in claim 5 including selecting all possible groupings of alarm types from all unique combinations of available alarm types or of an subset thereof.

7. A method as claimed in claim 5 including deriving an individual measure from each of the given groupings of alarm types within the training set and sorting the groupings in order according to the values of the individual measures.

8. A method as claimed in claim 7 including displaying the given groupings of alarm types in said order along with information on the customer identifiers associated with the groupings of further alarms corresponding to the given groupings of alarms within the training set.

9. A method as claimed in claim 1 including the step of inhibiting a user account associated with a customer identifier determined as being connection with fraudulent use of the network.

10. A method as claimed in claim 1 including updating the measure in step (d) on the basis of an independent analysis as to whether the customer identifier determined at step (c) to be associated with fraud has been correctly so determined.

11. A method as claimed in claim 3 including maintaining a database of customer identifiers and, associated with the customer identifiers, the number of alarms generated by that customer broken down by alarm type.

12. A method as claimed in claim 11 in which the database further includes the total number of alarms of all types corresponding to each customer identifier.

13. A method of claim 1, wherein said measure indicative of fraud is weighted.

14. A system for detecting possible fraudulent use of a telecommunications network, the system comprising:
   (a) means for receiving alarms indicative of potentially fraudulent calls on the network, the alarms being divided into a plurality of alarm types;
   (b) means for associating a unique customer identifier with each alarm;
   (c) means for selecting a training set of customer identifiers such that each customer identifier in the training set is associated with a given grouping of alarm types;
   (d) means for identifying those customer identifiers within the training set that are associated with known fraudulent calls and deriving a measure therefrom indicative of fraud within each said given grouping within the training set,
   (e) means for determining that any customer identifier associated with further alarms is connected with fraudulent use of the network if the grouping of the further alarms corresponds to one of the given groupings of alarms within said training set and if said respective measure of alarms for that grouping exceeds a given level;

the measure being a function of
   (A) the number of customer identifiers within the given grouping that are associated with known fraudulent calls;
   (B) the total number of customer identifiers in the given grouping; and in which the function is the ratio (A)/(B); and a confidence factor determined for each said given grouping, said factor being a function of:
   (A) the number of customer identifiers within the given grouping that are associated with the known fraudulent calls:
   (C) the total number of customer identifiers within the training set that are associated with the known fraudulent calls:

in which the function determining the confidence factor is a ratio (A)/(C); and using said confidence factor in subsequent updating of the respective measures for each of said given groupings.

15. A system for detecting the possible fraudulent use of said telecommunications network as in claim 14, in which the measure indicate of fraud is weighted.

* * * * *